3,523,154
ORAL HYGIENE WITH DICHLORO-2-QUANIDINO
BENZIMIDAZOLES AND SALTS THEREOF
David Huntington Gould, Leonia, N.J., assignor to Colgate-Palmolive Company, New York, N.Y., a corporation of Delaware
No Drawing. Original application Nov. 12, 1965, Ser. No. 507,536. Divided and this application June 21, 1968, Ser. No. 738,862
The portion of the term of the patent subsequent to Sept. 19, 1984, has been disclaimed and dedicated to the Public
Int. Cl. A61r 7/16
U.S. Cl. 424—52      10 Claims

ABSTRACT OF THE DISCLOSURE

Improving oral hygiene by reducing incidence of caries by contacting dichloro-2-guanidino benzimidazoles with the oral cavity.

This application is a division of Ser. No. 507,536, filed Nov. 12, 1965, and now abandoned.

The present invention relates to a method of improving oral hygiene and, more particularly, to a method of reducing the incidence of caries. The present invention also provides compositions effective in improving oral hygiene and reducing the incidence of caries comprising essentially a nontoxic carrier and an effective amount of chlorinated guanidino benzimidazole and/or salts of the aforesaid guanidino benzimidazole with nontoxic acids.

The essential active component of a composition useful in practicing oral hygiene and reducing the incidence of caries, whether it takes the form of a lozene, a tablet, a liquid gargle, or mouth wash, a dentifrice paste or powder and the like, is dichloro-2-guanidino benzimidazole, and/or salts thereof with nontoxic acids. The free base dichloro-2-guanidino benzimidazole can be represented by the formula:

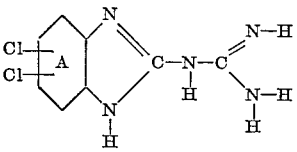

wherein

is a six carbon aromatic ring.

Although various imidazoles, benzimidazoles, guanidines, and bisguanidines have in many instances been shown to possess antimicrobial capabilities, there are no known simple germicides which, when applied topically to the oral cavity have been shown to reduce the incidence of caries. The dichloro-2-guanidino benzimidazoles have the particular capabilities of being absorbed by proteinaceous material and released by said proteinaceous material in vitro. To this particular combination of properties can be ascribed the usefulness of the dichloro-2-guanidino benzimidazoles for improving oral hygiene including reducing the incidence of caries.

The active material, i.e., the dichloro-2-quanidino benzimidazole in which the benzene ring is substituted by chlorine at the 5,6- or 4,5- or 4,6- or 4,7-positions is formulated as lozenges or chewable tablets, gargles or mouth washes, powder or paste dentifrices with active substance in solution or suspension, and can be combined with other active agents, e.g., $Na_2FPO_3$ and antibiotics such as tylosin and desmycosin for additive effects.

The dichloro-2-guanidino benzimidazoles are effective as the free bases as well as the salts of nontoxic acids. Presently preferred of the dichloro-2-guanidino benzimidazoles is 5,6-dichloro-2-guanidino benzimidazole. Illustrative of the capabilities of the dichloro-2-guanidino benzimidazole is the effectiveness of 5,6-dichloro-2-guanidino benzimidazole which, by daily applications of solutions or suspensions of the free base, the hydrochloride, and the half-malonate has been shown to improve oral hygiene and particularly to reduce the incidence of caries.

In general, oral hygiene is improved by contacting the oral cavity with the dichloro-2-guanidino benzimidazole in effective concentration in a non-toxic carrier. Thus, for example, a chewable tablet essentially contains an effective concentration to about 2 percent or about 100 milligrams per tablet and preferably about 1 to about 2 percent (about 50 to about 100 milligrams per tablet) of dichloro-2-guanidino benzimidazole the compound presently preferred being 5,6-dichloro-2-guanidino benzimidazole; about 30 to about 70 percent of compatible abrasive such as talc, chalk, alumina, insoluble sodium metaphosphate or anhydrous dicalcium phosphate; about 30 to about 50 percent of nontoxic humectant such as mannitol or sorbitol; about 0.5 to about 3 percent of detritus-suspending material such as carboxymethyl cellulose or Irish moss; about 1 to about 3 percent of nontoxic detergent, particularly a sarcosinate such as sodium N-lauroyl sarcosinate; about 5 percent of a binder such as polyethylene glycol (molecular weight about 6000); about 1 to 2 percent of a die lubricant such as magnesium stearate; and flavoring, coloring and sweetening to make one hundred percent.

A mouth rinse comprises an effective concentration to about 0.5 percent and preferably about 0.25 to about 0.5 percent of dichloro-2-guanidino benzimidazole; about 0.5 to about 1 percent of a nontoxic, nonionic detergent such as sorbitan monostearate polyoxyethylene condensate containing about 60 mols of ethylene oxide, cationic detergent such as quaternary ammonium salt, e.g., diisobutyl phenoxyethoxyethyl-dimethyl-benzyl ammonium chloride; sweetener, aqueous alcohol, flavoring and color, to make one hundred percent.

A dental cream comprises essentially an effective concentration to about 2 percent and preferably 0.5 percent to about 2 percent of dichloro-2-guanidino benzimidazole; about 30 to about 60 percent of abrasive such as talc, chalk, alumina, insoluble sodium metaphosphate or anhydrous dicalcium phosphate; about 20 to about 40 percent of a nontoxic humectant such as sorbitol, mannitol or glycerol; about 1 to about 3 percent of nonionic, cationic, or anionic nontoxic detergent, preferably sodium N-lauroyl sarcosinate, and water to make one hundred percent. In addition, a fluorine-containing compound such as $Na_2FPO_3$ or NaF to provide 0.1 percent of fluorine, an opacifier, such as titanium dioxide, in an effective amount as about 0.4 percent; a debris-suspending material such as gum tragacanth or carboxymethyl cellulose in amount of about 1 to about 2 percent; and sweetening, flavoring, and coloring can be added.

A presently preferred formulation of a chewable tablet is the following:

| Ingredient: | Percent weight |
|---|---|
| 5,6-dichloro-2-guanidino benzimidazole | 1.00 |
| Insoluble sodium metaphosphate | 31.69 |
| Talc | 0.50 |
| Dicalcium phosphate (anhydrous) | 4.03 |
| Mannitol | 47.30 |
| Starch | 3.00 |
| Carboxymethyl cellulose (7 m.p.) | 1.25 |
| Sodium N-lauroyl sarcosinate | 2.25 |
| Polyethylene glycol (mol. wt. about 6000) | 5.00 |
| Saccharine | 0.25 |
| Magnesium stearate | 1.25 |
| Flavoring, coloring | 2.48 |
| | 100.00 |

A presently preferred formulation of a mouth rinse is the following:

| Ingredient: | Percent by weight |
|---|---|
| Isethionate salt of 5,6-dichloro-2-guanidino benzimidazole | 0.25 |
| Diisobutyl phenoxyethoxyethyldimethylbenzyl ammonium chloride | 0.075 |
| Sorbitan monostearate polyoxyethylene condensate containing about 60 mols. of ethylene oxide | 0.60 |
| Saccharine | 0.035 |
| Ethyl alcohol | 14.78 |
| Water, flavoring and color | Balance |
| | 100.00 |

The following formulation of dental cream is presently preferred:

| Ingredient: | Percent weight |
|---|---|
| Hydrochloride of 5,6-dichloro-2-guanidino benzimidazole | 0.50 |
| Sodium benzoate | 0.15 |
| Saccharine | 0.20 |
| Sodium N-lauroyl sarcosinate | 2.00 |
| Insoluble sodium metaphosphate | 40.60 |
| Dicalcium phosphate | 4.24 |
| Titanium dioxide | 0.40 |
| $Na_2FPO_3$ | 0.76 |
| Gum tragacanth | 1.40 |
| Glycerine (99.3%) | 27.10 |
| Water, color, flavoring | Balance |
| | 100.00 |

In view of the foregoing discussion and description of the present invention, those skilled in the art will understand that the dichloro-2-guanidino benzimidazoles can be used as the free bases or as the salts of nontoxic acids as solutions or as suspensions in nontoxic solvent or nontoxic carriers or nontoxic media. Since the preparation of dichloro-2-guanidino benzimidazoles is not the subject of the present invention and since the preparation thereof, for example, from chlorinated ortho phenylene-diamine and dicyandiamide is well known, it is not considered necessary to describe what is general knowledge in the art.

What is claimed is:

1. A method of improving oral hygiene which comprises intermittently contacting the oral cavity with a composition for improving oral hygiene comprising about 0.5 to about 1 percent by weight of a compound selected from the group consisting of dichloro-2-guanidino benzimidazoles and salts thereof of nontoxic acids.

2. A method of improving oral hygiene as set forth in claim 1 wherein said compound is selected from the group consisting of 5,6-dichloro-2-guanidino benzimidazole and salts thereof of nontoxic acids.

3. A method of improving oral hygiene as set forth in claim 1 wherein said compound is in a chewable tablet which comprises about 1 percent by weight of said compound, about 30 to 70 percent of compatible abrasive, about 30 to about 50 percent of nontoxic humectant, about 0.5 to about 3 percent of detritus-suspending material, about 1 to about 3 percent of nontoxic detergent, about 5 percent of a binder, about 1 to 2 percent of a die lubricant, flavoring, coloring and sweetening to make one hundred percent.

4. A method of improving oral hygiene as set forth in claim 1 wherein said compound is in a mouth rinse comprising about 0.5 percent by weight of said compound, about 0.5 to about 1 percent of a nontoxic detergent, sweetener, aqueous ethyl alcohol, flavoring and color to make one hundred percent.

5. A method of improving oral hygiene as set forth in claim 1 wherein said compound is in a dental cream comprising about 0.5 percent by weight of said compound, about 30 to about 60 percent of abrasive, about 20 to about 40 percent of nontoxic humectant, about 1 to 3 percent of compatible nontoxic detergent, and water to make 100 percent.

6. A method of improving oral hygiene as set forth in claim 1 wherein said compound is in a chewable tablet comprising:

| Ingredient: | Percent weight |
|---|---|
| 5,6-dichloro-2-guanidino benzimidazole | 1.00 |
| Insoluble sodium metaphosphate | 31.69 |
| Talc | 0.50 |
| Dicalcium phosphate (anhydrous) | 4.03 |
| Mannitol | 47.30 |
| Starch | 3.00 |
| Carboxymethyl cellulose (7 m.p.) | 1.25 |
| Sodium N-lauroyl sarcosinate | 2.25 |
| Polyethylene glycol (mol. wt. about 6000) | 5.00 |
| Saccharine | 0.25 |
| Magnesium stearate | 1.25 |
| Flavoring, coloring | 2.48 |
| | 100.00 |

7. A method of improving oral hygiene as set forth in claim 1 wherein said compound is in a dental cream comprising:

| Ingredient: | Percent weight |
|---|---|
| Hydrochloride of 5,6,-dichloro-2-guanidino benzimidazole | 0.50 |
| Sodium benzoate | 0.15 |
| Saccharine | 0.20 |
| Sodium N-lauroyl sarcosinate | 2.00 |
| Insoluble sodium metaphosphate | 40.60 |
| Dicalcium phosphate | 4.24 |
| Titanium dioxide | 0.40 |
| $Na_2FPO_3$ | 0.76 |
| Gum tragacanth | 1.40 |
| Glycerin (99.3%) | 27.10 |
| Water, color, flavoring | Balance |
| | 100.00 |

8. A composition for improving oral hygiene consisting essentially of about 0.5 to about 1 percent by weight of dichloro-2-guanidino benzimidazole selected from the group consisting of 5,6-dichloro-2-guanidino benzimidazole; 4,5-dichloro-2-guanidino benzimidazole; 4,6-dichloro-2-guanidino benzimidazole; 4,7-dichloro-2-guanidino benzimidazole, and salts of the foregoing nontoxic acids and a nontoxic compatible carrier containing insoluble sodium metaphosphate.

9. A composition for improving oral hygiene as claimed in claim 8 wherein said compound is in a chewable tablet and is present in an amount of about 1 percent.

10. A composition for improving oral hygiene as claimed in claim 8 wherein said compound is a dental cream and is present in an amount of about 0.5 percent to about 1 percent by weight.

References Cited

UNITED STATES PATENTS 3,342,687  9/1967  Gould _____ 424—273

RICHARD L. HUFF, Primary Examiner

U.S. Cl. X.R.

424—54, 57